(12) United States Patent
Amler et al.

(10) Patent No.: US 9,908,433 B2
(45) Date of Patent: Mar. 6, 2018

(54) RELIABLE ELECTRIC BRAKE FOR A SYNCHRONOUS ENGINE

(71) Applicant: Siemens Aktiengesellschaft, München (DE)

(72) Inventors: Gerald Amler, Nürnberg (DE); Hans Bergner, Erlangen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 15/539,963

(22) PCT Filed: Nov. 27, 2015

(86) PCT No.: PCT/EP2015/077875
§ 371 (c)(1),
(2) Date: Jun. 26, 2017

(87) PCT Pub. No.: WO2016/107707
PCT Pub. Date: Jul. 7, 2016

(65) Prior Publication Data
US 2017/0355280 A1    Dec. 14, 2017

(30) Foreign Application Priority Data
Dec. 29, 2014  (EP) ..................... 14200387

(51) Int. Cl.
*H02P 3/22* (2006.01)
*B60L 15/20* (2006.01)
(Continued)

(52) U.S. Cl.
CPC .......... *B60L 15/2009* (2013.01); *B60L 7/003* (2013.01); *B60L 7/06* (2013.01); *B60L 7/08* (2013.01);
(Continued)

(58) Field of Classification Search
CPC ........ B60L 15/2009; B60L 7/003; B60L 7/06; B60L 7/08; B60L 7/26; B60L 15/007;
(Continued)

(56) References Cited

U.S. PATENT DOCUMENTS 6,141,199 A * 10/2000 Fornari ................. B60L 3/0023
318/362
6,291,952 B1 * 9/2001 Roth-Stielow ............ H02P 3/04
318/366
(Continued)

FOREIGN PATENT DOCUMENTS

DE    19 16 315 A1    10/1970
DE    21 14 121 A1    9/1972
(Continued)

*Primary Examiner* — Richard Camby
(74) *Attorney, Agent, or Firm* — Henry M. Feiereisen LLC (57) ABSTRACT

A method for controlling a braking torque of a drive system and for braking a vehicle includes in a first state connecting phase connections of a synchronous machine to one another by a changeover apparatus and short circuiting the phase connections such that a first braking torque develops at the synchronous machine. In a second state the phase connections are connected to one another by the changeover apparatus and to a resistance, such that a second braking torque develops at the synchronous machine. The changeover apparatus periodically switches between the first and second states at a switching frequency of 10 Hz or higher to produce a pre-settable braking torque at the synchronous machine, with the changeover between the first state and the second state being controlled by a timing element in an unregulated manner.

16 Claims, 4 Drawing Sheets

(51) Int. Cl.
*B60L 7/00* (2006.01)
*B60L 7/06* (2006.01)
*B60L 7/08* (2006.01)
*B60L 7/26* (2006.01)
*B60L 15/00* (2006.01)
*B60L 11/18* (2006.01)

(52) U.S. Cl.
CPC .............. *B60L 7/26* (2013.01); *B60L 11/1803* (2013.01); *B60L 15/007* (2013.01); *H02P 3/22* (2013.01); *B60L 2200/26* (2013.01)

(58) Field of Classification Search
CPC .... B60L 3/22; B60L 11/1803; B60L 2200/26; H02P 3/22
See application file for complete search history.

(56) References Cited

U.S. PATENT DOCUMENTS

| | | |
|---|---|---|
| 8,063,612 B2 | 11/2011 | Amler |
| 2004/0160208 A1 | 8/2004 | Youm et al. |
| 2009/0234548 A1 | 9/2009 | Bergner et al. |
| 2011/0057588 A1 | 3/2011 | Rineh et al. |
| 2012/0043817 A1 | 2/2012 | Hartwig et al. |
| 2012/0146592 A1 | 6/2012 | Ackermann et al. |
| 2014/0001987 A1 | 1/2014 | Okada |

FOREIGN PATENT DOCUMENTS

| | | |
|---|---|---|
| DE | 101 60 612 A1 | 6/2003 |
| DE | 10 2008 052 545 A1 | 4/2010 |

\* cited by examiner

RELIABLE ELECTRIC BRAKE FOR A SYNCHRONOUS ENGINE

CROSS-REFERENCES TO RELATED APPLICATIONS

This application is the U.S. National Stage of International Application No. PCT/EP2015/077875, filed Nov. 27, 2015, which designated the United States and has been published as International Publication No. WO 2016/107707 A1 and which claims the priority of European Patent Application, Serial No. 14200387.0, filed Dec. 29, 2014, pursuant to 35 U.S.C. 119(a)-(d).

BACKGROUND OF THE INVENTION

The invention relates to a method for the reliable control of a braking torque of a drive system with a synchronous machine. The invention further relates to a drive system and a vehicle, in particular a rail vehicle with a drive system of this type.

Drive systems which have a power converter and a motor, also designated an electric machine, can make a desired torque available very precisely at the shaft of the motor. This concerns both torques for accelerating the motor and braking torques for braking the motor.

This matter will be considered below in detail using the example of rail vehicles. Nowadays, rail vehicles are mostly electrically powered. A motor provides that the vehicle can accelerate and also brake. During braking by the motor, electrical energy is fed back and is then conducted into the supplying network or is dissipated via braking resistors. In addition to the electrical brake, the vehicles also possess a mechanical brake, also designated a friction brake, with brake disks or wheel brakes. This second mechanical brake device is therefore needed above all to be able to brake the vehicle on a failure of the electrical brake reliably. The present-day drive systems function so reliably that the mechanical brake is still practically only needed for holding braking at standstill but nevertheless must be configured for the entire rotary speed range.

Regulations require a reliable brake for the vehicle, which brings the vehicle reliably to a standstill in every state of the vehicle. Nowadays, the mechanical brake which is provided for this purpose has a clearly evident construction, from which the operation is readily evident. However, it is subject to wear, so that it requires regular servicing.

With the present-day regulation of the power converter, within the nominal values of the machine and the current converter any desired torques, and therefore also braking torques, can be set. However, the regulation of the power converter is very complex due to its many input variables and internal calculation steps. For this reason, error-free regulation for all the possible vehicle and operating states is extremely difficult to achieve. Thus, the power converter with its present-day regulation is suitable only as an operating brake, which is complimented with a mechanical brake configured for the vehicle and its characteristic values, to ensure that the safety requirements are met.

From DE 101 60 612 A1, a traction drive with a traction power converter and a permanent field synchronous machine is known. With a synchronous machine, also known as a synchronous motor, a braking torque can be simply created in that the terminals of the synchronous machine are connected to resistors. The document describes the changeover to a resistance group in order to brake the vehicle reliably. The braking torque adapts via the parameters of the machine and the resistance value, as well as the rotary speed.

From US 2012/0043817 A1, a drive system for a use with an isolated alternating current network is known. This drive system has a three-phase electrical machine which can be operated as a motor or a generator.

SUMMARY OF THE INVENTION

It is an object of the invention to provide a method for reliable braking of a drive system with a synchronous machine wherein a braking torque is generated which can be controlled.

This object is achieved with a method for reliably controlling a braking torque of a drive system, the drive system comprising a synchronous machine and a changeover apparatus, the synchronous machine having phase connections, wherein in a first state, the changeover apparatus connects the phase connections to one another such that a first braking torque $M_{Br1}$ develops at the synchronous machine and, in a second state, connects the phase connections to one another such that a second braking torque $M_{Br2}$ develops at the synchronous machine, wherein the changeover apparatus switches between the states such that on average over time, a pre-settable braking torque $M^*$ is produced at the synchronous machine. This object is further achieved by a drive system for carrying out the method for reliably controlling a braking torque, the drive system comprising a synchronous machine and a changeover apparatus, the synchronous machine having phase connections, wherein the changeover apparatus is electrically connected to the phase connections, wherein the changeover apparatus has a first and a second state wherein at least one value of the impedances between the phase connections differs in the first and second state of the changeover apparatus. Furthermore, this object is achieved by a vehicle, in particular a rail vehicle with a corresponding drive system.

Advantageous embodiments of the invention are disclosed in the dependent claims.

The invention is based upon the recognition that a synchronous machine, in particular a permanent field synchronous machine is suitable for ensuring reliable braking. The synchronous machine has the property, as soon as it is rotated, of generating a voltage which leads, via resistors, to currents and thus to a braking torque. Therefore, with few elements, a simple electrical brake can be constructed. By means of the few elements, this brake is suitable to fulfill the approval conditions for a reliable electric brake. Due to the low complexity, demonstration of the required reliability is possible relatively simply.

Alongside the reliable production of the braking effect, the brake must be controllable in order, for example, not to exceed the maximum frictional value between wheel and rail.

In order to manage with as few additional components as possible for the control system, which additional components would increase the complexity of the control system and would make the demonstration of reliability difficult, for the generation of the braking torque, a changeover apparatus is provided in the drive system. It is the purpose of the changeover apparatus that the changeover apparatus switches the phase connections of the synchronous machine such that in at least two states of the changeover apparatus, two different braking torques arise at the synchronous machine. It has proved advantageous herein if in a first state of the changeover apparatus, the phase connections of the synchronous machine are short circuited and in a second state of the changeover apparatus, the phase connections are connected, preferably symmetrically to one another, to at least one resistance. In order to create the symmetry, it has proved to be advantageous to rectify the currents of the phase connections, for example, by means of a B6-diode bridge and subsequently to feed the rectified current to a resistance. By means of the changeover between the two states of the changeover apparatus, a braking torque is realized at the synchronous machine which corresponds to the average over time of the applied first braking torque and the applied second braking torque. A corresponding target value, also designated a pre-definable braking torque, can be pre-set for the control system. It has proved to be particularly favorable if the switching between the states of the changeover apparatus takes place in the order of 10 Hz. At this switching frequency or higher switching frequencies, a variation of the braking torque does not noticeably affect the rotary speed or velocity of the drive system, due to the inertia of the drive system.

As the changeover apparatus, a self-commutated power converter already present in the drive system with one or more braking controllers in the intermediate circuit can also be used. On use of a plurality of braking controllers, more states of the changeover apparatus are achievable, from which the pre-settable braking torque can be generated at the synchronous machine. What is designated the braking controller is a series connection of a resistance and a switch wherein this series connection is arranged electrically in parallel with an intermediate circuit capacitor of the self-commutated power converter. The switch is herein mostly configured as an electronic power switch so that it is usable for rapid switching processes up to the kHz range. In the blocked state of the power semiconductors of the self-commutated power converter, the freewheeling diodes of the self-commutated power converter conduct the current when the intermediate voltage is reduced by the braking resistor. The braking energy is converted into heat by the braking resistor. The switch which connects the braking resistor to the intermediate circuit can be realized, in order to use as little electronics as possible, for example by a contactor, which switches on the braking resistor during the braking. Through the selection of the resistance value, the braking force is set by means of the rotary speed or velocity.

In order to achieve a particularly advantageous control of the braking torque, the self-commutated power converter should be controlled such that periodically, transitioning takes place from the state "current via freewheeling diodes" in which the phase connections are electrically connected to the resistance of the braking controller via the freewheeling diodes, into the state "short circuit" in which the phase connections of the synchronous machine are short circuited by the semiconductor power switches of the self-commutated power converter. Due to the high inductances of the synchronous machine, particularly with permanent field synchronous machines, during the short circuit of the phase connections, no currents occur that are inadmissibly high for the self-commutated power converters. Normally, the short circuit currents are only insignificantly greater than the nominal currents. With the short circuiting of the electrical machine wherein the electrical machine is also designated a motor, another braking characteristic is produced which has hardly any torque, particularly at high rotary speeds. Through the periodic changeover of the states, changing occurs between the braking characteristics. Depending on the ratio of the durations of the two states, therefore, on average one braking characteristic is achievable which lies between the resistance characteristic and the short circuit characteristic. From the maximum velocity to low velocities, therefore, a continuous braking torque control between the maximum torque and small torques is possible.

This control of the braking torque requires no regulation of the machine or the current, for example using machine variables. Purely by means of the antiskid protection, also known in other vehicles as an anti-locking braking system (ABS), more or less torque can be demanded and thus the torque can be reduced or increased relative to the maximum value.

At low rotary speeds, the short circuit and resistance characteristics of the braking torque intersect one another. At this point, no adjustability of the torque is possible with this method. A control system can be achieved at this rotary speed or velocity in that the switch of the braking controller is operated in clocked mode, that is, periodically. The clocked operation of the braking controller with a pulse control factor<1 acts as an enlargement of the connected resistance. By this means, for example, at a resistance of 1 Ohm and a pulse control factor of 50%, a braking torque characteristic like that at a resistance of 2 Ohm and a 100% pulse control factor results. Herein, 100% pulse control factor means that the switch is switched on continually.

Through the clocked operation of the switch of the braking controller, a further possibility for influence at higher rotary speeds also exists. Since the value of the braking resistor determines the position of the braking torque maximum, a displacement of this maximum by means of the braking controller pulse control factor is thus possible. By this means, depending on the pulse control factor of the braking controller, a change is made, on average, from one characteristic to a reduced characteristic. If this control possibility is used, the resistance can be dimensioned relatively low-ohmic so that the maximum braking torque is achieved at a lower velocity. Above this velocity, the effective braking resistance can be raised by means of the braking controller control factor so that up to maximum velocities, the maximum braking torque is available.

At very low rotary speeds, particularly close to standstill, however, no electric brake is possible with the method described. Here, the vehicle must be brought to a standstill by means of a simple holding brake. The braking energy that must be converted in the brake into heat for this last residual velocity is factors smaller than the overall energy of a train at maximum velocity. The remaining mechanical brake can therefore be configured thermally very sparingly and therefore very economically.

The changeover between the short circuit and the resistance characteristics of the braking torque can be realized in an advantageous embodiment by a simple timing element in order to adjust the temporal mean value of the characteristics. For the braking of the vehicle, a repetition rate of ca. 10 Hz would certainly be sufficient so that a variation of the braking torque of the vehicle is not perceptible. The advantage lies in the unregulated implementation. A possible further embodiment lies therein that the pulse-pause ratio is synchronized to the rotary speed of the machine. The rotary speed or the frequency of the electrical variables can be obtained, for example, from the measured motor currents. Thus, the state "short circuit" is adopted a fixed number of times per fundamental oscillation period. With a continuous adjustment of the pulse-pause ratio, there are no transient phenomena. Regulation of the current is also still unnecessary. The pulse-pause ratio can be pre-set. Only the frequency is determined by means of the synchronization.

As described above, in order to extend the characteristic region of the braking torques, the clocking of the switch of the braking controller can also be set controlled from the state variables. For example, the pulse control factor can be varied dependent upon the rotary speed. Here also, regulation is not required.

In diode operation, at the resistance the current flows not via six, but three freewheeling diodes. Depending on the sign of the current, this is via one upper or one lower freewheeling diode. Herein, the following switching states can arise either one upper and two lower freewheeling diodes or conversely via two upper and one lower freewheeling diodes. In all, there are six combination possibilities. For the transition into the short circuit, therefore, at the power converter, three semiconductor power switches of the power converter do not have to be switched on. It is sufficient to switch on a single semiconductor power switch of the power converter, specifically that which lies in the same (upper or lower) half of the power converter as the conducting freewheeling diodes. This can be found out by simple logic from the sign of the currents. With this method, the switching frequency of the power semiconductors represents the fundamental frequency of the motor, which also minimizes the losses of the power converter.

The method described is also usable when, in place of the braking controller or in addition to the braking controller, an external resistance device is used.

In exactly the same way, it is possible to switch a further rectifier and resistance in parallel with the freewheeling diodes of the power converter. The reduction of the braking torque through short circuiting by means of the power converter thus takes place as described.

With what power the motor actually brakes can be determined from a simple calculation from voltages and currents at the motor. Thus, in order to increase the reliability, the effectiveness of the brake can be tested simply and effectively. This increases the reliability of the electric brake and simplifies the approval of such a method for a vehicle, in particular, a rail vehicle. Alternatively, the calculation of the braking torque applied at the synchronous machine can take place by measuring voltage and current at the resistance. From these variables, it can be determined whether the vehicle is actually braking and whether the braking torque represents the target value. Thus, an independent monitoring of the method for safely controlling a braking torque can be realized simply and reliably.

BRIEF DESCRIPTION OF THE DRAWING

The invention will now be described and explained in greater detail making reference to the exemplary embodiments illustrated in the drawings, in which.

DETAILED DESCRIPTION OF PREFERRED EMBODIMENTS

Figure 1:
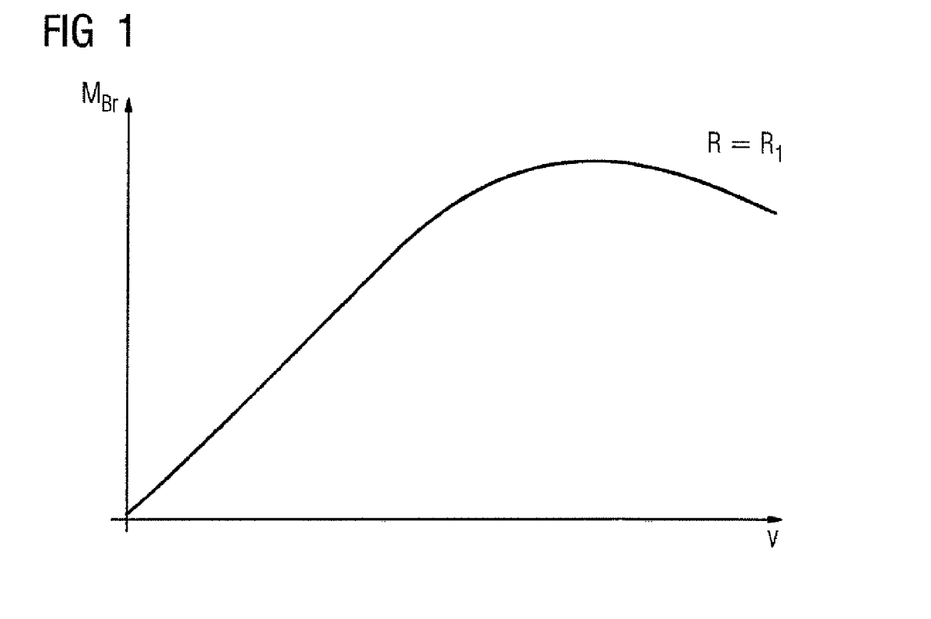
FIG. 1, FIG. 2 are examples of the shape of the braking torque over velocity for two different resistance values.

FIG. 1 shows the shape of the braking torque $M_{Br}$ against rotary speed in the event that the phase connections 20 are each electrically connected to a resistance 4 with a value $R_1$.

Figure 2:
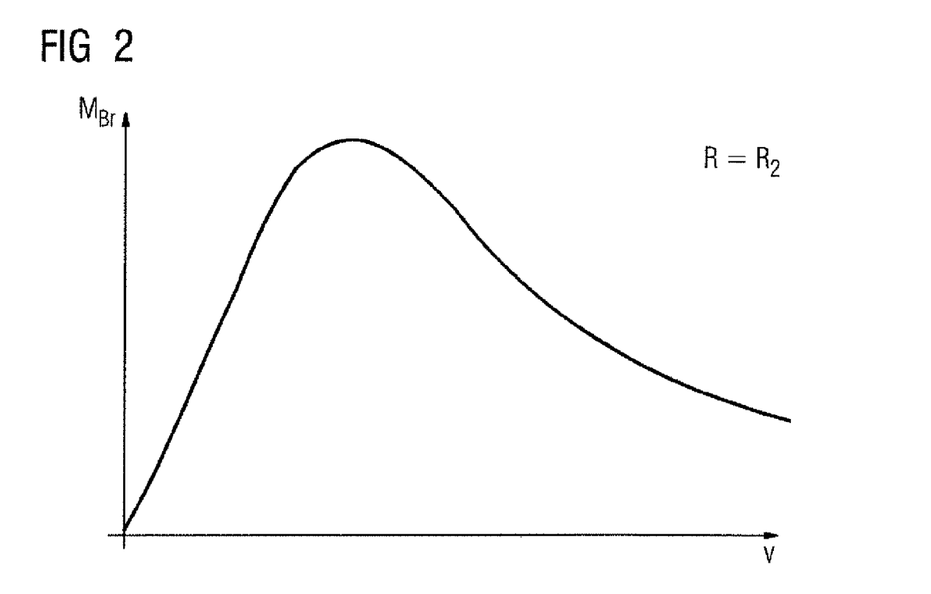

For a second resistance 4 with a value $R_2$, where $R_2 < R_1$, the shape is shown in FIG. 2. It is clearly apparent that the maximum of the achievable braking torque $M_{Br}$ for relatively small resistances 4 occurs at lower velocities. At a rotary speed of zero, regardless of the resistance value, no braking torque $M_{Br}$ is achievable at the synchronous machine 2. In order to be able to apply a braking torque to the drive system also at standstill, a further brake, for example, a mechanical brake must be provided in the drive system 1.

Figure 3:
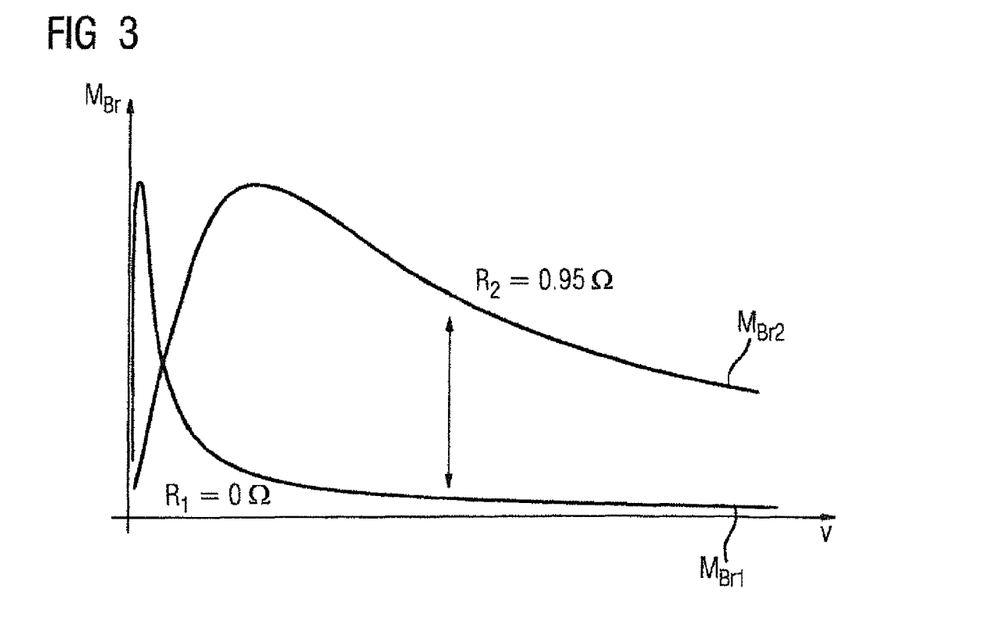
FIG. 3 is the exemplary shape of two braking torques.

FIG. 3 shows the shape of a first braking torque $M_{Br1}$ where this arises in that the phase connections 20 of the synchronous machine 2 are short circuited, and the shape of a second braking torque $M_{Br2}$ wherein the phase connections 20 are connected to one another via at least one resistance 4. The region that lies between the two curves can be used by the method for reliably controlling the braking torque $M_{Br}$ such that a braking torque $M_{Br}$ is generated at the synchronous machine 2. The region above the second braking torque, at least the part which lies to the right of the maximum of the second braking torque $M_{Br2}$, can be generated at the synchronous machine 2 if the changeover apparatus 3 has a switch 5 which temporarily interrupts the current flow through the resistance 4. With this interruption, the effective resistance at the phase connections 20 can be increased, which leads to a prolongation of the maximum toward higher rotary speeds.

Figure 4:
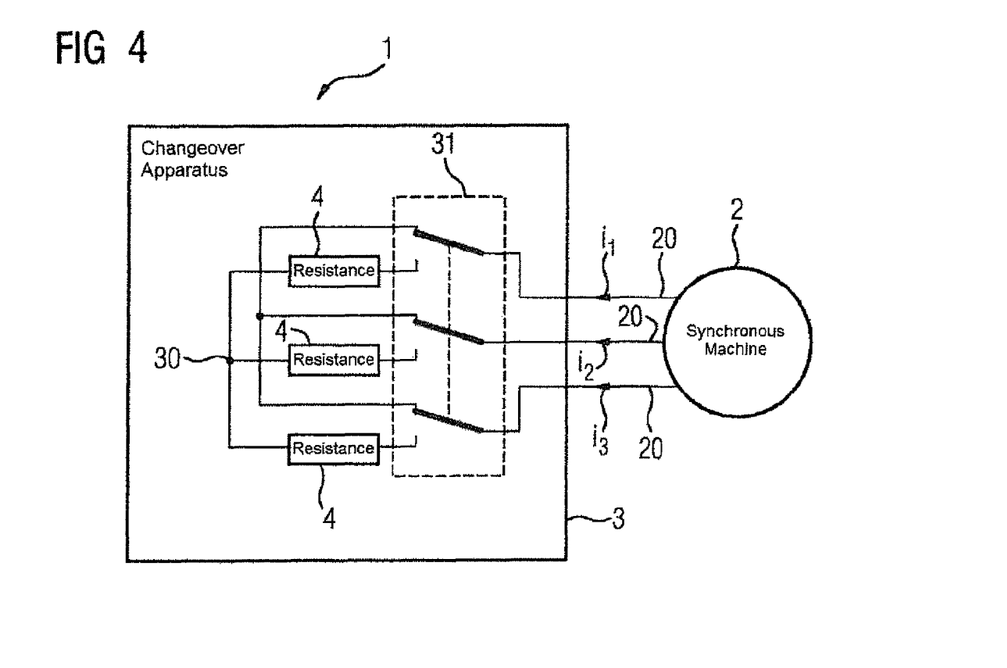
FIG. 4 is a first exemplary embodiment of the invention.

FIG. 4 shows a first exemplary embodiment of the invention. The drive system 1 herein has a synchronous machine 2, in particular a permanent field synchronous machine 2 and a changeover apparatus 3 which are electrically connected to one another via the phase connections 20. The changeover apparatus 3 comprises a changeover apparatus switch 31. In an upper position of the changeover apparatus switch 31, as shown, this short circuits the phase connections 20, whereas in a second position, i.e. in the lower position of the changeover apparatus switch 31, the changeover apparatus switch 31 connects the phase connections 20 of the synchronous machine 2 to one another via a star connection of resistances 4. The star connection is formed by a connection between the switch contacts of the changeover apparatus 31 and a star point 30 wherein the resistance 4 is respectively arranged in each such connection. It has proved to be advantageous to provide the same resistance values for the resistances 4 shown. Thus, the braking torque is constant over a motor rotation. Unpleasant shuddering, for example, in a vehicle or rail vehicle, is thereby prevented.

Figure 5:
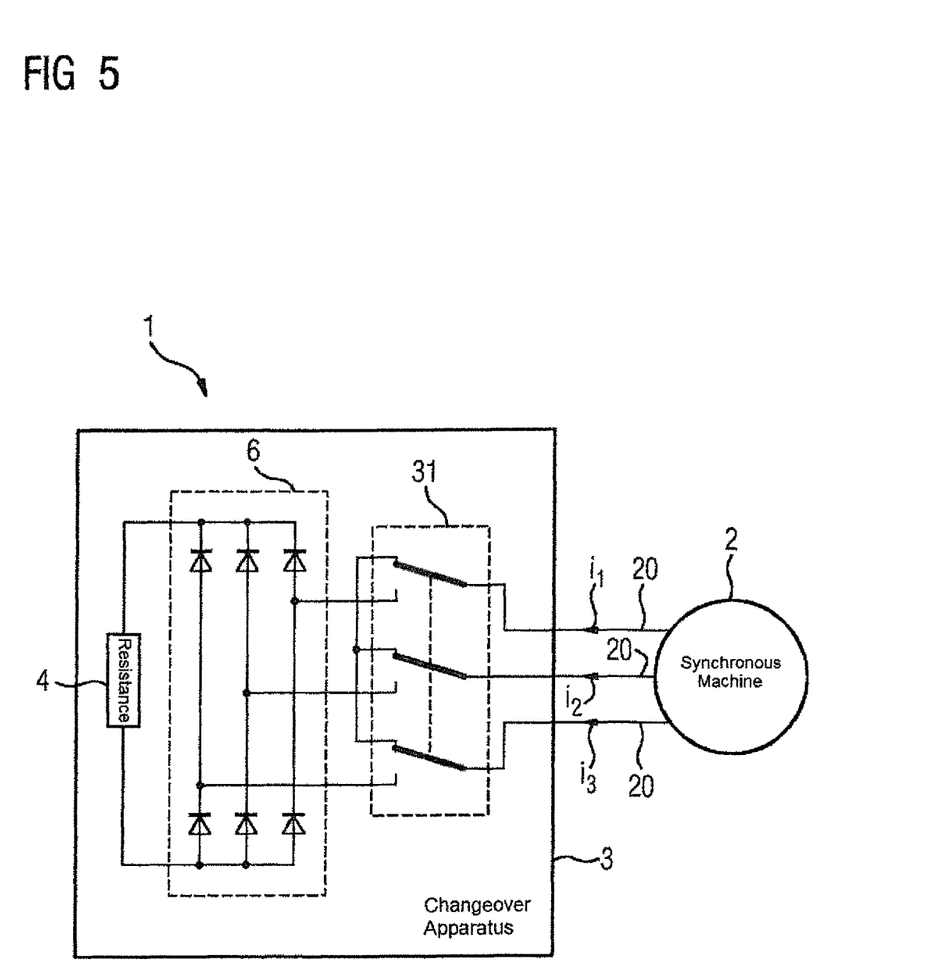
FIG. 5 is a second exemplary embodiment of the invention.

In the exemplary embodiment of FIG. 5 a smaller number of resistances 4 suffices as compared with the exemplary embodiment of FIG. 4. For the avoidance of repetition, reference is made to the description relating to FIG. 4 and the reference signs therein. In the exemplary embodiment of FIG. 5 also, an even braking torque over the whole rotation of the synchronous machine 2 is achieved in that in relation to all the phase connections 20, by the rectification, symmetrical conditions are created. The rectification of the currents of the phase connections 20 is carried out by the means 6 for rectification. In this exemplary embodiment, this is realized by a diode bridge. This diode bridge is designated an uncontrolled B6 bridge or B6 diode bridge. This requires no control and can be economically integrated in the changeover apparatus 3.

Figure 6:
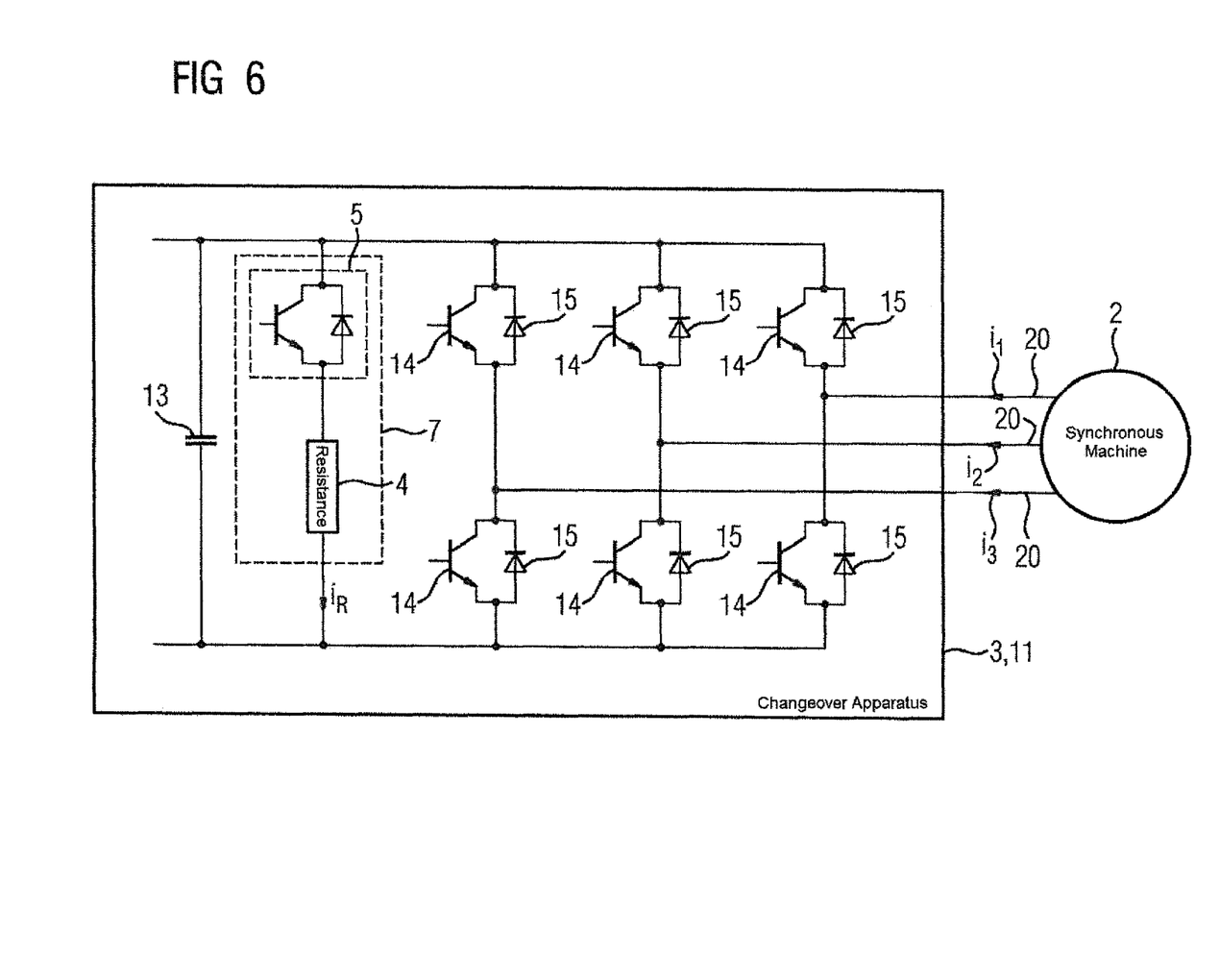
FIG. 6 is a further exemplary embodiment with a self-commutated power converter as the changeover apparatus.

FIG. 6 shows an exemplary embodiment, wherein the changeover apparatus is formed by a self-commutated power converter 11. For the avoidance of repetition, reference is made to the description regarding FIGS. 1 to 5 and the reference signs therein. The self-commutated power converter 11 has a braking controller 7, an intermediate circuit capacitor 13 and power semiconductors 14, 15. A braking controller 7 is arranged in the intermediate circuit. This is arranged parallel to the intermediate circuit capacitor 13. The braking controller has a series connection of the resistance 4 and a switch 5. The power semiconductors 14, 15 of the power converter, i.e. the semiconductor power switch 14 and the freewheeling diode 15 assume the role of the changeover apparatus switch 31. If none of the semiconductor power switches is controlled, currents can only flow via the freewheeling diodes 15 of the self-commutated power converter 11. This takes place when the intermediate circuit voltage, i.e. the voltage at the intermediate circuit capacitor 13 is lower than the amplitude of the voltage induced by the synchronous machine 2. If necessary, the voltage of the intermediate circuit capacitor 13 can be lowered by switching on the switch 5 so far that the freewheeling diodes 15 become conductive and a current flows through the resistance 4.

In this exemplary embodiment, the switch 5 can be configured, for example, as an electronic power switch, as shown, or as a mechanical switch. In one embodiment as an electronic power switch, it can switch at a high frequency. The switching of an electronic power switch is also designated clocking. If a particularly simple construction is striven for, a mechanical switch can be used as the switch 5, for example a contactor. This switch 5 requires no triggering electronics. With this simple triggering, the mechanical switch is suitable, in particular, for safety-relevant equipment such as the reliable braking of a vehicle.

In the first state of the changeover apparatus 3, the phase connections 20 of the synchronous machine 2 are short circuited. This takes place with the aid of the power semiconductors 14, 15 of the self-commutated power converter 11. In order to create the short circuit, all the phase connections 20 are connected either to the upper or the lower intermediate circuit potential. For this purpose, at least one semiconductor power switch 14 is to be switched on. Based upon the direction of flow of the currents $i_1$, $i_2$, $i_3$ of the phase connections 20, it is decided whether, during the short circuit, the relevant phase current flows through the semiconductor power switch 14 or the freewheeling diodes 15. Then, only the semiconductor power switch 14 is to be controlled, i.e. switched on, so that the short circuit of the phase connections 20 is produced. In order to avoid a selection logic for the triggering of the semiconductor power switch 15, all the upper semiconductor power switches 15 or all the lower semiconductor power switches 15 can be triggered. The upper semiconductor power switches 15 denotes the semiconductor power switches 15 which are connected to the positive intermediate circuit potential. The lower semiconductor power switches 15 are understood to be the semiconductor power switches 15 which are connected to the negative intermediate circuit potential.

In the second state of the changeover apparatus 3 in which the phase connections of the synchronous machine are connected to the resistance 4, the switch 5 must be continually switched on or clocked. By means of the clocking, i.e. the repeated switching on and off of the switch 5, the resistance 4 effective for the braking torque of the synchronous machine 2 is increased. Thus, the range of the braking torques achievable at the synchronous machine 2 is increased, as shown in FIG. 3. Since the intermediate circuit capacitor 13 is arranged in parallel with the braking controller 7, the switch 5 can be opened in a simple manner, even when the currents are driven through the inductances of the synchronous machine 2, since on switching off the switch 5, a path for these currents through the intermediate capacitor 13 forms. The semiconductor power switches 14 of the self-commutated power converter 11 are not controlled in the second state of the changeover apparatus 3, i.e. these semiconductor power switches 14 are switched off.

Although the invention has been illustrated and described in detail based on the preferred exemplary embodiments, the invention is not restricted solely to the examples given and other variations can be derived therefrom by a person skilled in the art without departing from the protective scope of the invention.

What is claimed is:

1. A method for reliably controlling a braking torque of a drive system and for braking a vehicle, said method comprising:
   in a first state connecting phase connections of a synchronous machine to one another by a changeover apparatus and short circuiting the phase connections, such that a first braking torque develops at the synchronous machine;
   in a second state connecting the phase connections to one another by the changeover apparatus and to a resistance, such that a second braking torque develops at the synchronous machine;
   periodically switching between the first state and the second state by the changeover apparatus at a switching frequency of 10 Hz or higher for producing a pre-settable braking torque on average over time of the first and second braking torques at the synchronous machine; and
   controlling by a timing element in an unregulated manner the switching between the first state and the second state.

2. The method of claim 1, wherein the vehicle is constructed in the form of a rail vehicle.

3. The method of claim 1, wherein the short circuiting is adopted for a fixed number of oscillation periods.

4. The method of claim 1, further comprising checking voltages and currents at the phase connections for achieving the pre-settable braking torque at the synchronous machine to enhance reliability of a brake.

5. The method of claim 1, further comprising activating a mechanical brake when a pre-set rotary speed of the drive system or a pre-set velocity of the vehicle is undershot.

6. The method of claim 1, further comprising:
   rectifying currents of the phase connections for developing the second braking torque; and
   feeding the currents to the resistance following the rectifying.

7. The method of claim 1, further comprising interrupting a current through the resistance via a switch for changing a resistance value effective for generating the second braking torque, such that the second braking torque changes.

8. The method of claim 7, further comprising:
   forming the changeover apparatus by a self-commutated power converter including on a direct current side an electrical parallel connection of an intermediate circuit capacitor, a series connection of the resistance, the switch and a semiconductor power switch;
   in a first state of the self-commutated power converter controlling the semiconductor power switch for short circuiting the phase connections; and
   in a second state of the self-commutated power converter not controlling the semiconductor power switch for connecting the phase connections to the resistance via freewheeling diodes.

9. A drive system for reliably controlling a braking torque and for braking a vehicle, comprising:
- a synchronous machine including phase connections;
- a changeover apparatus electrically connected to the phase connections, said changeover apparatus having a first state in which the phase connections are short circuited, and a second state in which the phase connections are connected to a resistance at the synchronous machine; and
- a timing element configured to control periodically switching between the first state and the second state at a switching frequency of 10 Hz or higher in an unregulated manner.

10. The drive system of claim 9, wherein the phase connections are each connected via a said resistance to a star point in the second state of the changeover apparatus.

11. The drive system of claim 9, wherein the changeover apparatus is formed by a self-commutated power converter, said self-commutated power converter being connected to the phase connections on an alternating current side, said self-commutated power converter including on a direct current side an intermediate circuit, said resistance being arranged in a series connection with a switch, with the series connection being arranged electrically in parallel with the intermediate circuit.

12. The drive system of claim 9, wherein the changeover apparatus is formed by a self-commuted power converter, said self-commuted power converter including on a direct current side an electrical parallel connection of an intermediate circuit capacitor, a series connection of the resistance, the switch and a semiconductor power switch, wherein the semiconductor power switch is controlled for short circuiting the phase connections in the first state and the semiconductor switch is not controlled for connecting the phase connections to the resistance via freewheeling diodes in the second state.

13. A vehicle, comprising a drive system for reliably controlling a braking torque and for braking the vehicle, said drive system comprising a synchronous machine including phase connections, a changeover apparatus electrically connected to the phase connections, said changeover apparatus having a first state in which the phase connections are short circuited, and a second state in which the phase connections are connected to a resistance, and a timing element configured to control periodically switching between the first state and the second state at a switching frequency of 10 Hz or higher in an unregulated manner.

14. The vehicle of claim 13 constructed in the form of a rail vehicle.

15. The vehicle of claim 13, wherein the changeover apparatus is formed by a self-commutated power converter, said self-commutated power converter being connected to the phase connections on an alternating current side, said self-commutated power converter including on a direct current side an intermediate circuit, said resistance being arranged in a series connection with a switch, wherein the series connection is arranged electrically in parallel with the intermediate circuit of the self-commutated power converter.

16. The vehicle of claim 13, wherein the changeover apparatus is formed by a self-commuted power converter, said self-commuted power converter including on a direct current side an electrical parallel connection of an intermediate circuit capacitor, a series connection of the resistance, the switch and a semiconductor power switch, wherein the semiconductor power switch is controlled for short circuiting the phase connections in the first state and the semiconductor switch is not controlled for connecting the phase connections to the resistance via freewheeling diodes in the second state.

* * * * *